United States Patent [19]
Park et al.

[11] Patent Number: 5,802,040
[45] Date of Patent: Sep. 1, 1998

[54] CONGESTION CONTROL UNIT AND METHOD IN AN ASYNCHRONOUS TRANSFER MODE (ATM) NETWORK

[75] Inventors: Hong Shik Park; Woo Seop Rhee; Dong Yong Kwak; Man Yeong Jeon, all of Daejeon, Rep. of Korea

[73] Assignee: Electronics and Telecommunications Research Institute, Daejeon, Rep. of Korea

[21] Appl. No.: 742,673

[22] Filed: Nov. 4, 1996

[30] Foreign Application Priority Data

Nov. 4, 1995 [KR] Rep. of Korea ............... 1995-39793

[51] Int. Cl.[6] ............................................. H04J 3/14
[52] U.S. Cl. ............................. 370/232; 370/253
[58] Field of Search ......................... 370/229, 230, 370/231, 232, 233, 234, 235, 236, 237, 238, 241, 242, 244, 248, 250, 252, 253, 395, 396, 398, 465

[56] References Cited

U.S. PATENT DOCUMENTS

| | | | |
|---|---|---|---|
| 4,984,264 | 1/1991 | Katsube | 379/197 |
| 5,179,556 | 1/1993 | Turner | 370/233 |
| 5,253,248 | 10/1993 | Dravida et al. | 370/228 |
| 5,280,483 | 1/1994 | Kamoi et al. | 370/234 |
| 5,335,222 | 8/1994 | Kamoi et al. | 370/230 |
| 5,400,329 | 3/1995 | Tokura et al. | 370/232 |
| 5,583,857 | 12/1996 | Soumiya et al. | 370/233 |
| 5,691,975 | 11/1997 | Hamada et al. | 370/232 |
| 5,719,853 | 2/1998 | Ikeda | 370/229 |

OTHER PUBLICATIONS

Combined Reactive/Preventive Approach for Congestion Control in ATM Networks; Wassim Matragi and Khosrow Sohraby; 1993 IEEE; pp. 1336–1342.

Adaptive Connection Admission and Flow Control: Quality of Service with High Utilisation; Andreas Pitsillides and Jim Lambert; 1994 IEEE; pp. 1083–1091.

*Primary Examiner*—Alpus H. Hsu
*Assistant Examiner*—Kwang B. Yao
*Attorney, Agent, or Firm*—Antonelli, Terry, Stout & Kruas, LLP

[57] ABSTRACT

A congestion control unit and method in an ATM network is disclosed. The congestion control unit includes a congestion detector, a congestion controller and a routing controller. The congestion detector receives the measured number of cells generated from an output link through an ATM switch module, transmits the measured number of cells to an adaptive connection admission control unit, and detects the state of the output link by use of a utilization of a cell transmission link. The congestion controller receives congestion state information from the congestion detector and receives a cell loss ratio through the ATM switch module. The congestion controller transmits a backward resource management cell to a user or generates a routing control request signal so as to assign the load of the input traffic to another affordable link, and supplies a monitor parameter to the ATM switch module. The routing controller receives the routing control request signal from the congestion controller, and supplies routing information on an affordable link of the same destination to the ATM switch module.

4 Claims, 3 Drawing Sheets

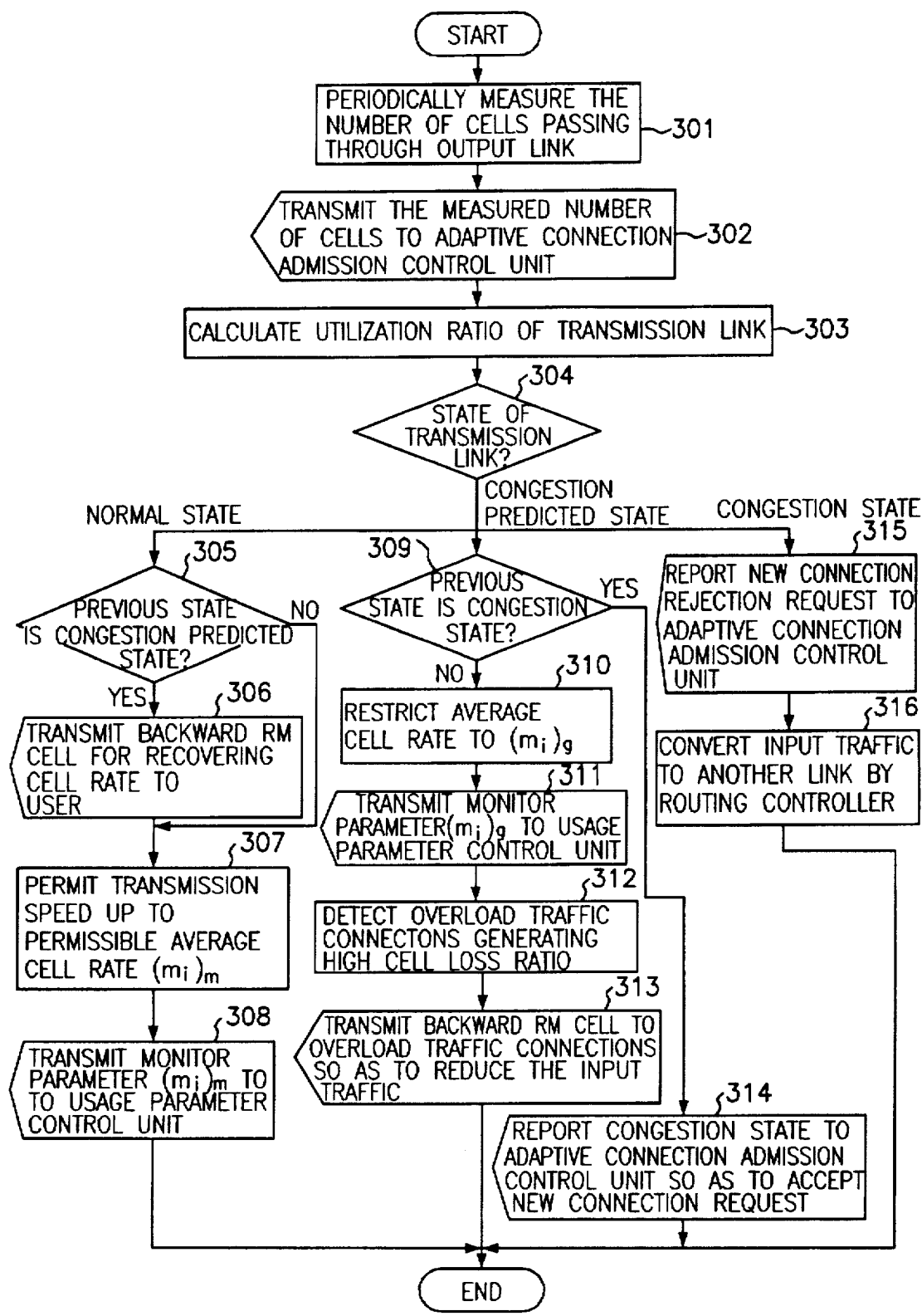

CONGESTION CONTROL UNIT AND METHOD IN AN ASYNCHRONOUS TRANSFER MODE (ATM) NETWORK

BACKGROUND OF THE INVENTION

The present invention relates to a congestion control unit and method which can maximize the efficiency of a network resource and reliably ensure a user's request for quality in an asynchronous transfer mode (ATM) network.

In an ATM network, there is strong possibility that congestion occurs when traffic control is not appropriately implemented due to traffic variations in a broadband ISDN (integrated services digital network) service terminal which is difficult to predict. The congestion of the ATM network indicates that the efficiency of bandwidth utilization of the network is lowered and the transmission quality such as cell delay time or cell loss ratio cannot be ensured because a transmission bandwidth is used excessively beyond a previously negotiated value due to the overload of unexpected input traffic of user terminals. Therefore, an efficient congestion control mechanism is required to control such unexpected congestion in the ATM network. The congestion control mechanism is broadly divided into preventive control and reactive control. The preventive control prevents congestion by using a connection admission control function, a usage parameter control function and negotiated parameters in the connection set-up phase. However, since the preventive control uses only negotiated parameters, it is vulnerable to congestion due to unexpected input traffic. The reactive control transmits feedback information to the user when the congestion is estimated while monitoring the state of the network, thereby suppressing the input of the traffic. However, although the input traffic is directly controlled when the congestion is estimated, the reactive control has no effect on real-time traffic due to a round trip delay time.

SUMMARY OF THE INVENTION

It is an object of the present invention to provide a congestion control unit and method which can improve an availability ratio of a network resource in an ATM network.

In the present invention, preventive control and reactive control are incorporated. The peak cell rate negotiated in the connection set-up phase and an average cell rate calculated by measurement and estimation are used to implement an adaptive connection admission control function and a usage parameter control function. Therefore, congestion of a network is prevented. If congestion is predicted or congestion occurs, a backward RM (resource management) cell is transmitted to reduce an input traffic. Thus, a user's request for quality can be reliably ensured by flexibly coping with unexpected input traffic. If bandwidth utilization of a network is low, an average cell rate is permitted to increase.

According to one aspect of the present invention, a congestion control unit in an ATM network includes:

a congestion detector for receiving the measured number of cells generated from an output link through an ATM switch module, transmitting the number of cells measured by counting cells passing through the output link to an adaptive connection admission control unit, detecting the state of the output link by utilization of a cell transmission link, generating congestion state information when congestion is predicted or the output link incurs congestion, and notifying the adaptive connection admission control unit that the output link is in the congestion state so as not to accept a new connection request when the output link is in the congestion state;

a congestion controller for receiving the congestion state information from the congestion detector, receiving a cell loss ratio through the ATM switch module, transmitting a backward resource management cell to a user transmitting overload traffic so as to reduce a transmission rate of input traffic or generating a routing control request signal so as to assign the load of the input traffic to another affordable link, receiving a control parameter from the adaptive connection admission control unit, and supplying a monitor parameter for monitoring a cell rate to the ATM switch module; and a routing controller for receiving the routing control request signal from the congestion controller, and supplying routing information on an affordable link of the same destination to the ATM switch module.

According to another aspect of the present invention, a congestion control method in an ATM network includes the steps of:

periodically measuring the number of cells passing through an output link, transmitting the measured number of cells to an adaptive connection admission control unit so as to be used for connection admission control, and checking the state of a transmission link by calculating utilization of the transmission link;

if the state of the transmission link is a normal state, checking a previous state, if the previous state is a predicted congestion state, transmitting a backward resource management cell for recovering a transmission rate to a user, permitting the transmission rate to rise up to a permissible average cell rate since the affordable bandwidth is sufficient, and transmitting the permissible average cell rate as a monitor parameter to a usage parameter control unit;

if the transmission link is a predicted congestion state, checking the previous state;

if the previous state is not the congestion state, restricting the average cell rate which is permitted up to the permissible average cell rate to a negotiated average cell rate, transmitting a monitor parameter to the usage parameter control unit so as to recover the negotiated average cell rate, detecting overload traffic connections generating a high cell loss ratio by checking a cell loss ratio of each connection received from the usage parameter control unit, and transmitting the backward resource management cell to the overload traffic connections so as to reduce input traffic;

if the transmission link is the congestion state, reporting a new connection rejection request to the adaptive connection acceptance control unit since a user's request for transmission quality cannot be guaranteed, and converting the input traffic to another link of the same destination in order to decentralize the load of the input traffic.

BRIEF DESCRIPTION OF THE ATTACHED DRAWING

FIG. 3 is a flow chart showing a congestion control operation according to the present invention.

DETAILED DESCRIPTION OF PREFERRED EMBODIMENT

Figure 1:
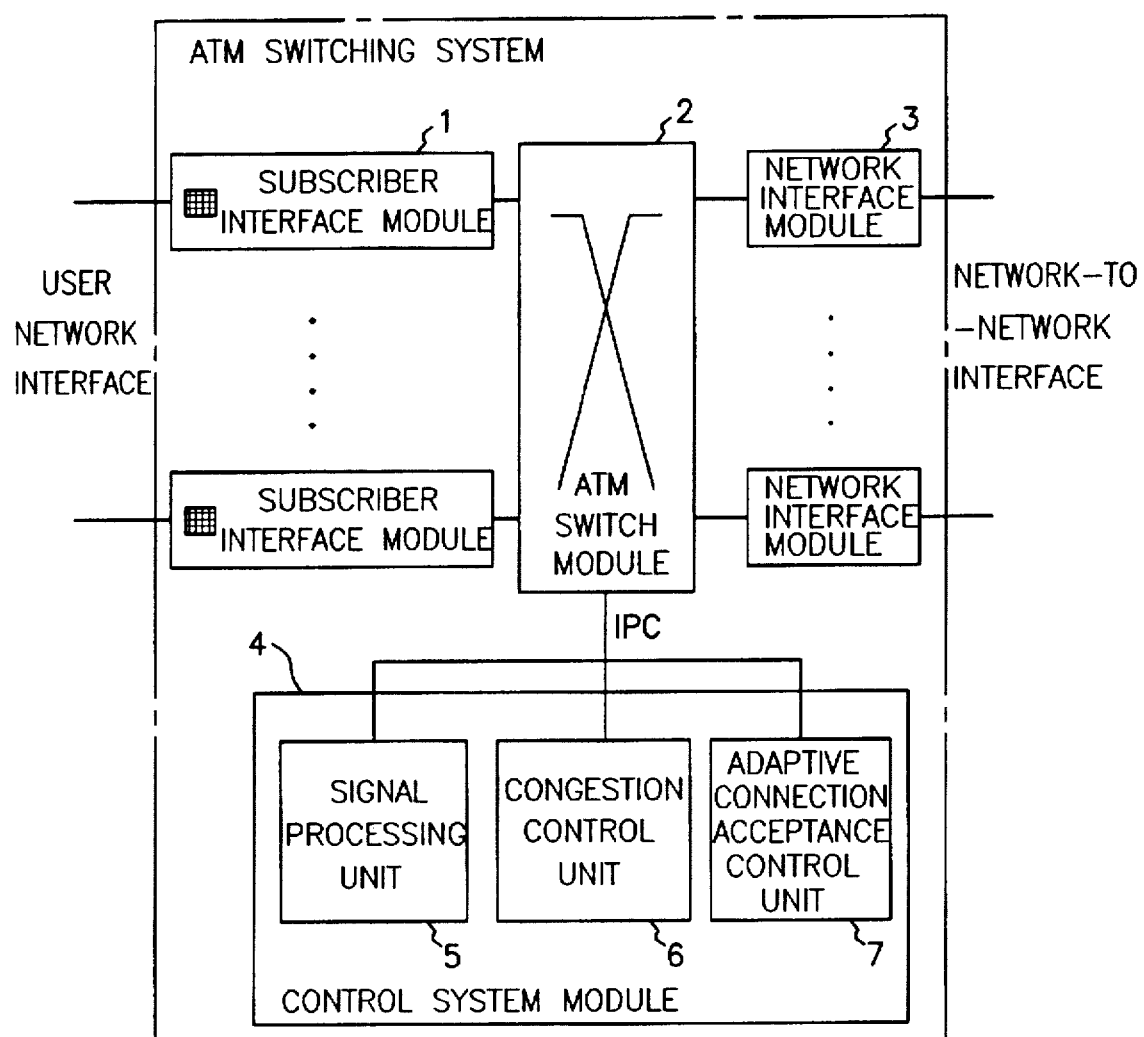
FIG. 1 is a block diagram of an ATM switching system applied to the present invention.

Referring to FIG. 1, there is shown an ATM switching system. Reference numeral 1 designates a subscriber interface module, 2 an ATM switch module, 3 a network interface module, 4 a control system module, 5 a signal processing unit, 6 a congestion control unit, and 7 an adaptive connection acceptance control unit.

In the subscriber interface module 1 for interfacing with a user network, a usage parameter control unit for checking whether or not an input cell observes a negotiated parameter or performing the shaping function for peak cell rate is installed. The ATM switch module 2 switches cells to interface modules (2 or 3) by use of a routing tag attached to each cell. The network interface module 3 interface the ATM switching system and other networks. The signal processing unit 5 contained in the control system module 4 processes a signal protocol related to connection set up and release. The congestion control unit 6 implements a congestion control function by transmitting and receiving parameters related to traffic control to and from a related function module or unit using IPC (inter processor communication). For communication between the usage parameter control unit and the congestion control unit 6, an IPC message is transmitted through the ATM switch module 2. The adaptive connection acceptance control unit 7 periodically measures and estimates the cells passing through the ATM switch module 2 to determine whether the connection is accepted or not when the connection set-up is requested.

Figure 2:
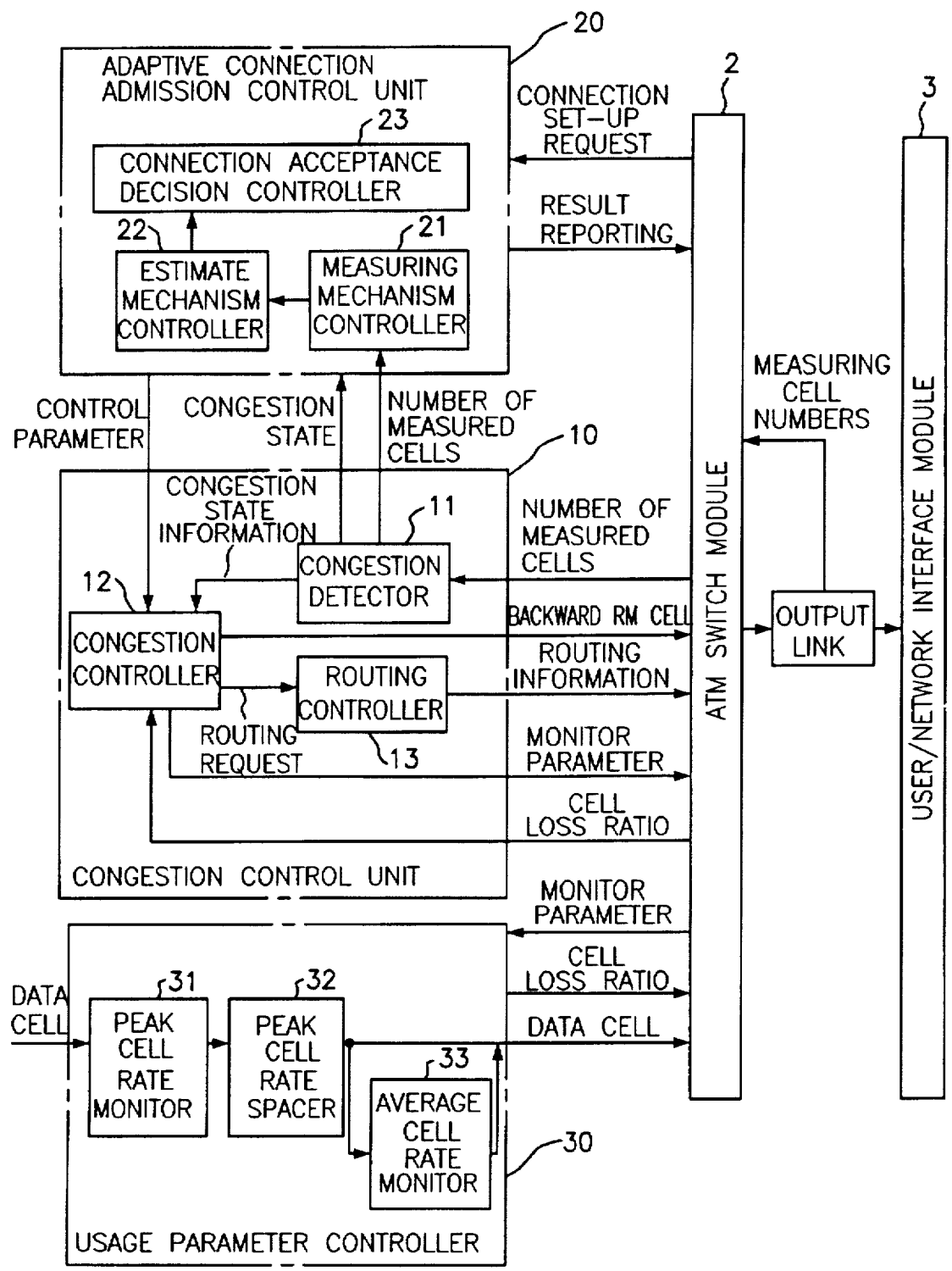
FIG. 2 is a block diagram of a congestion control unit according to the present invention.

Referring to FIG. 2, a congestion control unit 10 includes a congestion detector 11, a congestion controller 12 and a routing controller 13.

The congestion detector 11 receives the measured number of cells generated from an output link through the ATM switch module 2, and transmits the number of cells measured by counting cells passing through the output link to an adaptive connection admission control unit 20. A utilization p of a transmission link and 3 states of the transmission link are defined as follows using this number of cells:

link utilization p=(measured number of cells/number of unit slots of a measured interval)×V $0 \leq p \leq \sigma_n V$ $n$: normal state $\sigma_n V < p \leq \sigma_{cp} V$ $cp$: congestion predicted state $\sigma_{cp} V < p$ where p is the utilization ratio of the link, V is the capacity of the link, $\sigma_{cp}$ is about 0.9, and $(\sigma_{cp} - \sigma_n)$ can be determined by a round trip delay time of a feedback mechanism between a user and a network when the network is in a predicted congestion state. The congestion state is when the unit of the measured interval of N times shows the same state in consideration of variations in the link utilization ratio.

As a result of detecting the state of the output link by use of the utilization ratio of the transmission link, if the congestion state is predicted or the output link reaches the congestion state, the congestion detector 11 supplies congestion state information to the congestion controller 12. Moreover, if the output link is in the congestion state, the congestion detector 11 informs an adaptive connection admission control unit 20 that the output link is in the congestion state so as not to accept a new connection request.

The congestion controller 12 receives the congestion state information from the congestion detector 11. In order to control the congestion state, the congestion controller 12 receives a cell loss ratio transmitted by use of the IPC from the usage parameter control unit 30, and transmits a backward RM (resource management) cell to a user transmitting overload traffic so as to reduce the transmission rate of the input traffic or transmits a routing request signal to the routing controller 13 so as to assign the load of the input traffic to another affordable link. The congestion controller 12 transmits routing information to the ATM switch module 2 and routes the input traffic for the link of the congestion state to another link to recover from the congestion state. The congestion controller 12 receives a control parameter from the adaptive connection acceptance control unit 20, and supplies a monitor parameter for monitoring the cell speed to the usage parameter control unit 30 through the ATM switch module 2. If the routing request signal is received from the congestion controller 12, the routing controller 13 retrieves a routing table which is set when a system is started and transmits routing information on the affordable link of the same destination to the ATM switch module 2 to route the input traffic for the link of the congestion state to another link.

A measuring mechanism controller 21 of the adaptive connection acceptance control unit 20 measures an average cell rate of entire connections by the unit of the output link by use of the measured number of cells received from the congestion control unit 10. An estimate mechanism controller 22 estimates the average cell rate of each individual connection by use of the average cell rate of entire connections received from the measuring mechanism controller 21. A connection acceptance decision controller 23 receives the average cell transmission rate of the individual connection, a peak cell rate required by the user and a reference cell loss ratio, and reports a result of a new connection set-up request to the user.

The usage parameter control unit 30 receives, as the monitor parameter, the peak cell rate received from the user as a traffic parameter or the average cell rate calculated by measurement and estimation from the adaptive connection admission control unit 20. A peak cell rate monitor 31 monitors the peak cell rate. A peak cell rate spacer 32 maintains the cells at the peak cell interval to compensate for a cell delay variation. An average cell rate monitor 33 monitors the average cell rate. If it is not desired to monitor the average cell rate, the cells are directly transmitted to the ATM switch module 2. The cell loss ratio generated from each portion is transmitted to the congestion controller 12 of the congestion control unit 10 through the ATM switch module 2.

Referring to FIG. 3, there is shown a congestion control operation. The average cell rate is defined as follows:

(mi)m: permissible average cell rate in the network; and (mi)g: negotiated average cell rate. The network guarantees the service quality.

If the transmission link is a normal state, since there is a sufficient transmission bandwidth, there is no need to restrict the user transmission speed to the negotiated average cell rate. Hence, (mi)m is the average rate which is permitted even if the user transmits the cell at a rate faster than the negotiated average cell rate. At the average cell rate (mi)g which negotiates in a connection set-up phase, the network should guarantee the service quality.

The congestion detector 11 of the congestion control unit 10 periodically measures the number of cells passing through the output link (step 301), and transmits the measured number of cells to the adaptive connection admission control unit 20 so as to be used for the connection admission control (step 302). The utilization of the transmission link is calculated using the measured number of cells (step 303), and the state of the transmission link is checked (step 304).

If the state of the transmission link is a normal state, whether a previous state is a predicted congestion state is checked (step 305). If the previous state is the predicted congestion state, the backward RM cell for recovering the transmission rate is transmitted to the user (step 306). The transmission rate is permitted to the permissible average cell rate (mi)m since the affordable bandwidth is sufficient (step 307). If the previous state is not the predicted congestion state, step 305 is followed by step 307. A monitor parameter (mi)m is transmitted to the usage parameter control unit 30 (step 308). That is, if the state of the transmission link is the normal state, since the transmission bandwidth is affordable, the transmission speed is permitted up to the permissible average cell rate speed (mi)m. The user is permitted to violate the negotiated average cell rate to improve the utilization of the transmission link.

Meanwhile, the transmission link is the congestion predicted state, whether the previous state is the congestion state is checked (step 309). If the previous state is not the congestion state, the average cell rate which is permitted up to (mi)m is restricted to the negotiated average cell rate (mi)g (step 310). The monitor parameter (mi)g is transmitted to the usage parameter control unit 30 (step 311). Overload traffic connections generating a high cell loss ratio are detected by checking the cell loss ratio of each connection received from the usage parameter control unit 30 (step 312). The backward RM cell is transmitted to the overload traffic connections so as to reduce the input traffic (step 313). If the previous state is the congestion state, the congestion state is reported to the adaptive connection admission control unit 20 so as to accept a new connection request (step 314).

If the transmission link is the congestion state, a new connection rejection request is reported to the adaptive connection admission control unit 20 since a user's request for transmission quality cannot be guaranteed (step 315). In order to decentralize the load of the input traffic, the input traffic is converted to another link of the same destination to recover from the congestion state of the transmission link (step 316).

The above-described congestion control method incorporating the preventive control and the reactive control can recover from congestion state by coping with a unexpected input traffic and prevent the congestion state for a real time traffic, thereby ensuring a user's request for the transmission quality. The amount of an actually used traffic in addition to an negotiated parameters is measured and estimated to implement a connection admission control function. If there is affordable transmission band, the user is permitted to violate the negotiated average cell rate. Therefore, the utilization of a network resource can be improved.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A congestion control unit in an asynchronous transfer mode (ATM) network, comprising:

congestion detecting means for receiving the measured number of cells generated from an output link through an ATM switch module, transmitting the number of cells measured by counting cells passing through the output link to an adaptive connection admission control unit, detecting the state of the output link by use of utilization of a cell transmission link, generating congestion state information when a congestion state is predicted or the output link reaches the congestion state, and notifying said adaptive connection admission control unit that the output link is in the congestion state so as not to accept a new connection request when the output link is in the congestion state;

congestion control means for receiving said congestion state information from said congestion detecting means, receiving a cell loss ratio through said ATM switch module, transmitting a backward resource management cell to a user transmitting overload traffic so as to reduce a transmission rate of an input traffic or generating a routing control request signal so as to assign the load of the input traffic to another affordable link, receiving a control parameter from said adaptive connection admission control unit, and supplying a monitor parameter for monitoring a cell rate to said ATM switch module; and routing control means for receiving said routing control request signal from said congestion control means, and supplying routing information on an affordable link of the same destination to said ATM switch module.

2. A congestion control unit in an asynchronous transfer mode (ATM) network as claimed in claim 1, wherein said cell loss ratio of the cell transmission link is calculated by dividing the measured number of cells by the number of unit slots of a measured interval and multiplying the divided value by a capacity of the link.

3. A congestion control method in an asynchronous transfer mode (ATM) network, said method comprising the steps of:

(a) periodically measuring the number of cells passing through an output link, transmitting the measured number of cells to an adaptive connection admission control unit so as to be used for connection admission control, and checking the state of a transmission link by calculating an utilization of the transmission link;

(b) if the state or the transmission link is a normal state, checking a previous state, if the previous state is a congestion predicted state, transmitting a backward resource management cell for recovering a transmission rate to a user, permitting the transmission rate up to a permissible average cell rate since an affordable bandwidth is sufficient, and transmitting the permissible average cell rate as a monitor parameter to a usage parameter control unit;

(c) if the transmission link is a predicted congestion state, checking the previous state;

(d) if the previous state is not the congestion state, restricting the average cell rate which is permitted up to the permissible average cell rate to a negotiated average cell rate, transmitting a monitor parameter to said usage parameter control unit so as to recover the negotiated average cell rate, detecting overload traffic connections generating a high cell loss ratio by checking a cell loss ratio of each connection received from said usage parameter control unit, and transmitting the backward resource management cell to the overload traffic connections so as to reduce input traffic;

(e) if the previous state is the congestion state, reporting the congestion state to said adaptive connection admission control unit so as to accept a new connection request; and (f) if the transmission link is the congestion state, reporting a new connection rejection request to said adaptive connection admission control unit since a user's request for transmission quality cannot be guaranteed, and converting the input traffic to another link of the same destination in order to decentralize the load of the input traffic.

4. A congestion control method in an asynchronous transfer mode (ATM) network as claimed in claim 3, wherein said step (b) permits the transmission rate up to the permissible average cell rate, even though the user violates the negotiated average cell rate speed, in order to improve the utilization ratio of the transmission link.

* * * * *

UNITED STATES PATENT AND TRADEMARK OFFICE
CERTIFICATE OF CORRECTION

PATENT NO.    : 5,802,040
DATED         : September 1, 1998
INVENTOR(S)   : Park et al.

It is certified that error appears in the above-identified patent and that said Letters Patent is hereby corrected as shown below:

Title page,
Item [73], Assignee, should read -- Electronics and Telecommunications Research Institute and Korea Telecommunication Authority --

Signed and Sealed this

Tenth Day of August, 2004

JON W. DUDAS
*Acting Director of the United States Patent and Trademark Office*